United States Patent
Mizrahi et al.

(10) Patent No.: US 8,565,234 B1
(45) Date of Patent: Oct. 22, 2013

(54) MULTICAST QUEUEING IN A SWITCH

(75) Inventors: Tal Mizrahi, Haifa (IL); Carmi Arad, Nofit (IL); Martin White, Sunnyvale, CA (US); Tsahi Daniel, Palo Alto, CA (US)

(73) Assignees: Marvell Israel (M.I.S.L) Ltd., Yokneam (IL); Marvell International Ltd., Hamilton (BM)

(*) Notice: Subject to any disclaimer, the term of this patent is extended or adjusted under 35 U.S.C. 154(b) by 562 days.

(21) Appl. No.: 12/683,971

(22) Filed: Jan. 7, 2010

Related U.S. Application Data

(60) Provisional application No. 61/143,277, filed on Jan. 8, 2009, provisional application No. 61/162,803, filed on Mar. 24, 2009.

(51) Int. Cl.
*H04L 12/28* (2006.01)

(52) U.S. Cl.
USPC .............................. 370/390; 370/254; 709/217

(58) Field of Classification Search
USPC .................................. 370/390, 254; 709/217
See application file for complete search history.

(56) References Cited

U.S. PATENT DOCUMENTS

| | | | |
|---|---|---|---|
| 6,484,209 B1 * | 11/2002 | Momirov | 709/238 |
| 2005/0089064 A1 * | 4/2005 | Zimmerman et al. | 370/468 |
| 2006/0165111 A1 * | 7/2006 | Varma | 370/428 |
| 2007/0121499 A1 * | 5/2007 | Pal et al. | 370/230 |
| 2007/0183416 A1 * | 8/2007 | Gooch et al. | 370/389 |

* cited by examiner

*Primary Examiner* — Wei Zhao

(57) ABSTRACT

A method of configuring a plurality of aggregation queues for aggregating multicast network traffic includes configuring a first one of the plurality of aggregation queues to store at least data units associated with a first multicast group (MCG) and data units associated with a second MCG, and configuring a second one of the plurality of aggregation queues to store only those data units that are associated with a third MCG.

19 Claims, 9 Drawing Sheets

MULTICAST QUEUEING IN A SWITCH

CROSS-REFERENCE TO RELATED APPLICATION

This application that claims the benefit of U.S. Provisional Patent Applications Nos. 61/143,277, filed on Jan. 8, 2009, entitled "Multicast Queueing for Aggregated Frames" and 61/162,803 filed on Mar. 24, 2009, entitled "Multicast Queueing with Frame Aggregation." The entire disclosures of both of these applications are hereby incorporated by reference herein.

FIELD OF THE DISCLOSURE

The present disclosure relates generally to communication networks and, more particularly, to switching devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Most network switching systems support unicast network traffic flows directed at particular targets, multicast traffic flows directed at groups of targets, and broadcast traffic flows directed at every host in the network. In these systems, and especially in application to larger networks, it is difficult to efficiently utilize processing power, memory, and other resources to process multicast traffic flows.

SUMMARY

In an embodiment, a method of configuring a plurality of aggregation queues for aggregating multicast network traffic includes configuring a first one of the plurality of aggregation queues to store at least data units associated with a first multicast group (MCG) and data units associated with a second MCG, and configuring a second one of the plurality of aggregation queues to store only those data units that are associated with a third MCG.

In an embodiment, an apparatus includes a memory interface communicatively coupled to a memory that stores a plurality of aggregation queues; and a multicast forwarding engine configured to cause a first data unit that is associated with a first multicast flow to be stored in a first one of the plurality of aggregation queues, and cause a second data unit that is associated with a second multicast flow, the second multicast flow differing from the first multicast flow in at least one of priority and multicast group (MCG), to be stored in a second one of the plurality of aggregation queues and not in the first one of the plurality of aggregation queues.

In an embodiment, a method for processing multicast network traffic includes receiving a data unit associated with a first multicast flow; receiving a second data unit associated with a second multicast flow, where the second multicast flow differs from the first multicast flow in at least one of multicast target group (MCG) and priority; selecting one of a plurality of aggregation queues; and causing the first data unit and the second data unit to be stored in the selected one of the plurality of aggregation queues.

DETAILED DESCRIPTION

Example switching methods and apparatus are described herein in the context of Ethernet networks. One of ordinary skill in the art will recognize, in light of the disclosure and teachings herein, that similar methods and apparatus are suitable for use in other communication networks as well.

Figure 1:
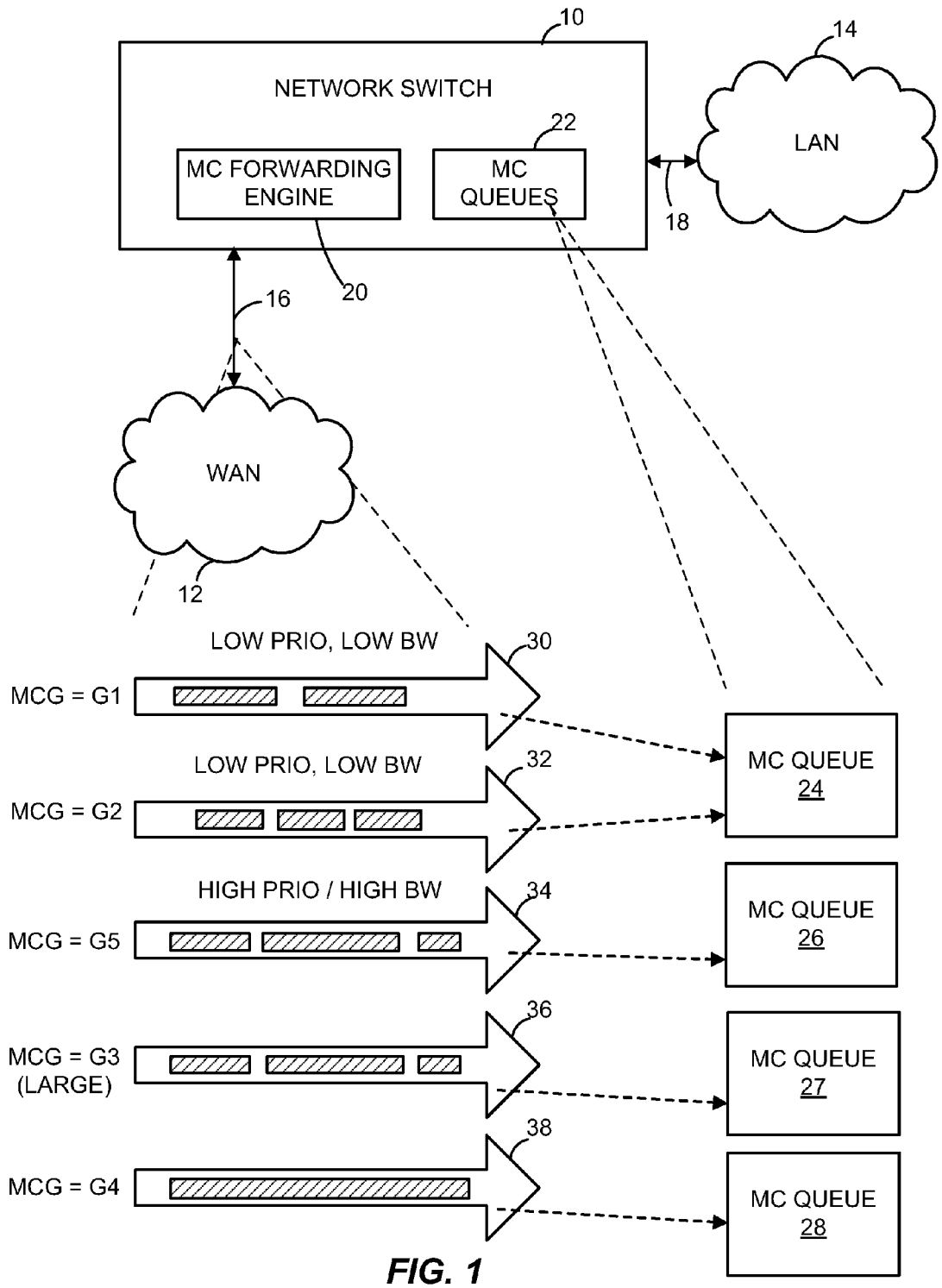
FIG. 1 is a block diagram of an example communication system in which a network switch with a multicast forwarding engine may be utilized in accordance with an embodiment of the present disclosure.

FIG. 1 is a block diagram of a network switch 10 in an example arrangement between an external network 12 and an internal network 14. The network switch 10 generally includes a network interface with one or several network ports to communicate with the networks 12 and 14 via respective links 16 and 18. In some embodiments particularly applicable to larger networks, the network switch 10 includes a chassis to support multiple modules such as, for example, "blade" cards compatible with Peripheral Component Interconnect (PCI) or similar standard. Some of the cards turn include multiple components such as packet processors that support networking functions, while other cards provide interconnectivity between packet processors. In these embodiments, the network switch 10 typically includes a large number of network ports and supports a large amount of network traffic.

In operation, a multicast (MC) forwarding engine 20 processes MC data flows 30-38, each of which is illustrated as flowing in the inbound directed relative to the internal network 14 for ease of explanation. Each of the MC data flows 30-38 is associated with a certain group of target devices, referred to herein as a multicast group (MCG), and a certain level of priority relative to other data flows. To efficiently utilize the available memory, processing, and bandwidth resources, the MC forwarding engine 20 operates on a group of MC data aggregation queues (hereinafter, "MC queues") 24-28 disposed in an MC queue memory 22 in which MC data packets are stored and/or aggregated into communication frames (hereinafter, "frames") prior to being forwarded to the corresponding destinations. In particular, the MC forwarding engine 20 applies the configuration, selection, and mapping techniques discussed in detail below to process traffic associated with a relatively large number of MCGs and multiple priorities using a relatively small number of MC queues. For example, in an embodiment the network switch 10 uses only 16 MC queues to support 1,000 MCGs and three priority levels. In the example embodiment of FIG. 1, for example, the data flows 30 and 32 are directed to the common MC queue 24, the data flow 34 is directed to the MC queue 26, the data flows 36 is directed to the MC queue 27, and the data flow 38 is directed to the MC queue 28.

In general, the priority of an MC flow is defined using any suitable scheme. For example, in an embodiment, priorities correspond to classes of services being used in the network 12 or 14; alternatively, priorities are be custom-defined for a particular networking application.

In the example illustrated in FIG. 1, the MC flow 30 includes data packets directed at hosts in the MCG G1 that could be a relatively small group of hosts operating in the network 14. The MC flow 30 is a low-priority, low-bandwidth flow. Similarly, the MC flow 32 corresponds to a similarly small MCG G2, and also is a low-priority, low-bandwidth flow. By contrast, the MC flow 34 is a high-priority or a high-bandwidth flow directed at the MCG G5.

The MC flow 36 is directed at a large MCG G3. In one embodiment, the MCG G3 includes several hundred hosts. The final example illustrated in FIG. 1, the MC flow 38, is directed to a small group G4, and includes predominantly large data packets. Of course, many network traffic flows can include both small and large packets. However, certain flows are characterized by typically (or even always) carrying large data packets. For example, some HTTP flows include large data packets. In the example of FIG. 1, each of the flows 30-36 includes small or "normal"-sized data packets, or includes large data packets only occasionally. Of course, the network switch 10 can similarly process multicast flows flowing toward the external network 12.

In general, it is possible to aggregate multiple data packets for each MCG on a per-priority basis. In other words, in some embodiments a separate MC queue is set up for each MCG, priority combination, and several data packets stored in the queue are aggregated and transmitted to the corresponding MCG as a single communication unit with the priority shared by every data packet in the queue. This approach ensures that, on the one hand, data packets having different priories are not aggregated into a common frame (e.g., MC flows 30 and 34) and, on the other hand, that data packets directed to different targets are not aggregated into a common frame (e.g., MC flows 30 and 32). Unfortunately, this technique requires a very large number of MC queues in a typical medium or large network application. In the hypothetical situation mentioned above, it would be necessary to set up 3000 MC queues (1,000 MCGs×3 priority levels).

Further, it is possible to aggregate MC flows directed to different MCGs in a common frame, and broadcast the frame to ensure that each target in every MCG receives the data packet. In an embodiment, data packets associated with the MC flows 30 and 32 are aggregated into a common frame to be broadcast over the network 14. Of course, this approach results in waste of network bandwidth because hosts that do not belong to each of the MCG G1 and the MCG G2 will sometimes receive, only to discard, data packets not originally directed at these hosts.

Still further, network switch 10 could identify every target in every MCG and to store a MC data packet in each unicast (UC) target-specific queue. If, for example, the MCG G1 includes targets T1, T2, and T3, the network switch 10 would need to maintain separate UC queues for each of the targets T1, T2, and T3 and store a copy of each data packet directed at the MCG G1 in each of these targets. It is noted that this approach requires a large amount of memory and as well as frequent data packet replication.

Of course, a network switch could also not aggregate MC data packets at all, and instead send each MC data packet as a separate frame. Although this approach is suitable for large data packets, as discussed in more detail below, avoiding aggregation for small data packets is associated with a large overhead that can result in an impermissible latency.

With continued reference to FIG. 1, the MC forwarding engine 20 supports a flexible scheme according to which MC queues are configured with single or multiple MCG, priority associations and different aggregation settings. In an embodiment, one or more of the MC queues are used with multiple MC flows that do not share one or both of the MCG or priority, and one or more MC queues are used with a single corresponding MCG. For example, in an embodiment, the MC flows 30 and 32 are mapped to the common MC queue 24 and the MC flow 34 is mapped to another MC queue 26. Further, some MC queues are configured to aggregate data packets while other MC queue are configured to assign only a single data packet to a frame. For example, frame aggregation can be disabled for the MC queue that stores data packets in the MC flow 38. For convenience, MC queues to which more than one MCG, priority pair are mapped and in which frame aggregation is enabled are referred to herein as Type I MC queues; MC queues to which more than one MCG, priority pair are mapped and in which frame aggregation is disabled are referred to herein as Type II MC queues; and MC queues to which only one MCG, priority pair is mapped and in which frame aggregation is enabled are referred to herein as Type III MC queues. It is noted that it is also possible to map MC flows that have a common MCG but different priorities to a dedicated MC queue (or define other associations between MCGs and priorities as desired), and that the classification of MC queues discussed herein is provided by way of example only.

Because a Type I MC queue stores data packets directed to different MC groups, the MC forwarding engine 20 in these situations forwards frames assembled from multiple data packets in the MC queue to a group of targets that includes every host in every MCG group associated with the MC queue. This group of targets are configured to correspond to a broadcast group. Alternatively, the group of targets are configured to be a superset of the relevant MCGs, referred to herein as a frame multicast group (FMCG). Thus, for example, if the MCG G1 includes hosts A, B, C, and the MCG G2 includes hosts B, C, and D, the superset of the MCGs G1 and G2 is an FMCG that includes A, B, C, and D. FMCG configuration is discussed in more detail below with reference to FIG. 3.

In accordance with the classification discussed above, Type I MC queues are used, for example, for MC flows with relatively short data packets and low sensitivity to latency. In some cases, these flows are broadcast-oriented, although it is also possible to use Type I MC queues with smaller MCGs.

One example of an MC flow well-suited for mapping to a Type I MC queue is the ARP protocol. Regarding Type II MC queues, MC flows for which aggregation is disabled preferably include long data packets or, alternatively, include short or "regular" data packets but require low latency. Video streaming is one example of such MC flow. Further, a high priority or a high bandwidth MC flow in some embodiments is mapped to a dedicated Type III MC queue. For example, the MC flow 34 can be mapped to a Type III MC queue, and none of the other MC flows 30, 32, 36, or 38 would be mapped to the same MC queue. Depending on MC queue-specific configuration options, a group of MC queues can include two or more of the Types I, II, or III of MC queues (as discussed in more detail with reference to FIG. 3).

Referring still to FIG. 1, the network switch 10 in some embodiments is a part of data server, router, or other host performing a networking function. The external network 12 in the example of FIG. 1 is a wide area network (WAN) such as the Internet, and the internal network 14 is a local area network (LAN) such as one serving a particular a corporation, a university, or any other organization. Additionally or alternatively, the network switch 10 functions as a router between two or more several wide area networks or local area networks.

The network switch 10 communicates with the network 12 in a wired manner or wireless manner via a group of high-speed links 16 that include, for example, T-carrier links such as T1 lines, fiberoptic cables, or any other communication links including those currently known to those of ordinary skill in the art. The network 14 similarly communicates with the network switch 10 via a similar wired or wireless connection. Further, one or both of the links 16 and 18 correspond to a respective plurality of physical carriers such as wires, cables, or carrier radio frequencies.

Figure 2:
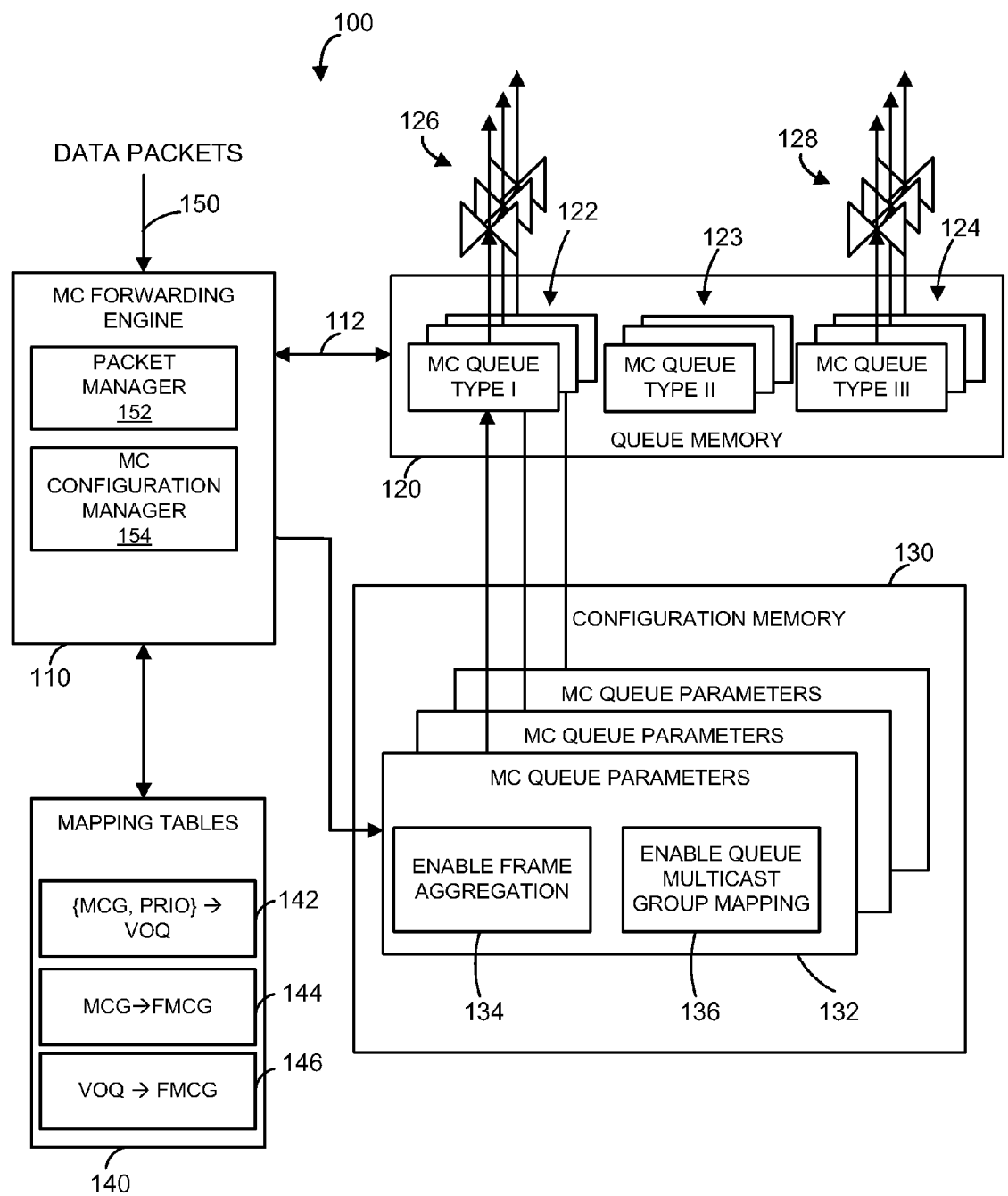
FIG. 2 is a block diagram of an example network switch that includes a multicast forwarding engine and a memory unit in accordance with an embodiment of the present disclosure.

Referring to FIG. 2, a network switch 100 is one example of a network switch that operates as the system illustrated in FIG. 1 in accordance with an embodiment of the present disclosure. The network switch 100 includes an MC forwarding engine 110 coupled via a memory interface 112 to a queue memory 120 that stores one or several Type I MC queues 122, one or several Type II MC queues 123, and one or several Type III MC queues 124. The association of MC queues with one of the types I, II, or III need not be static. If desired, in an embodiment, the type of an MC queue is changed dynamically. Moreover, in some embodiments, MC queues are added and deleted during runtime.

At least the Type I MC queues 122 and Type III MC queues 124 are coupled to respective aggregators 126 and 128. In this example embodiment, each MC queue is coupled to a dedicated aggregator. However, in other embodiments it is possible for a single aggregator component to process multiple queues or, as another alternative, process multiple MC queues of the same type. Further, Type II MC queues in some embodiments also are coupled to aggregators that operate in a pass-through mode while frame aggregation remains disabled.

The network switch 100 seen in FIG. 2 also includes a configuration memory to store a set of configuration parameters 132 for each MC queue in the queue memory 120. In particular, the set of configuration parameters 132 includes an enable frame aggregation parameter 134 and an enable queue multicast group mapping parameter 136.

The enable frame aggregation parameter 134 specifies whether multiple data packets should be aggregated into larger frames in the corresponding queue. If frame aggregation is disabled, every data packet is transmitted as a separate frame. In an embodiment, the frame aggregation parameter 134 is implemented as a Boolean flag that specifies whether frame aggregation is enabled or disabled.

The enable queue multicast group mapping parameter 136 determines which of available mapping techniques the MC forwarding engine 110 applies to the corresponding queue to determine an appropriate FMCG. As illustrated in FIG. 2, a mapping memory 140 several mapping data structures 142-146, implemented as tables in this example, to map MCG, priority pairs to MC queues (table 142), MCGs to FMCGs (table 144), and queues to FMCGs (table 146). A certain value of the queue multicast group mapping parameter 136 indicates that all traffic from the corresponding queue should be directed to a certain FMCG, and the table 144 should be used to identify the FMCG. Another value of the queue multicast group mapping parameter 136 indicates that the FMCG must be identified separately for each data packet stored in the MC queue.

With continued reference to FIG. 2, the MC forwarding engine 110 receives data packets via an input 150, and the data packet manager 152 determines the MCG, priority, and other data packet parameters of each received data packet. Using the determined data packet parameters, the data packet manager 152 identifies the appropriate queue for the data packet based on the information stored in the mapping memory 140 and direct the data packet to an appropriate MC queue in the queue memory 120. Alternatively, the MC forwarding engine 110 receives only short data packet descriptors that specify the relevant information (e.g., source, destination, MCG, priority) of a data packet so that the payload of the data packet need not propagate through the MC forwarding engine 110. In this embodiment, the queue memory 120 includes an additional interface to receive complete data packets.

In some embodiments, the data packet manager 152 also controls the operation of the aggregators 126 and 128. In particular, the data packet manager 152 controls the threshold value that determines the minimum amount of data stored in the queue that can be aggregated into a frame.

In an embodiment, the MC forwarding engine 110 also includes an MC configuration manager 154 to populate and update the mapping data structures 142-146. As one example, the MC configuration manager 154 receives configuration input from a human operator. As another example, configuration input arrives from an intelligent module that updates MC queue mapping in response to changes in network conditions. In some embodiments, the MC configuration manager 154 also updates the configuration memory 130 to reconfigure a certain Type I MC queue to be a Type II MC queue, for example. In other embodiments, the configuration memory 130 is static. In these embodiments, it is possible to implement the processing logic for each type of MC queue using a specific integrated circuit or specific firmware, for example, in the data packet manager 152.

Figure 3A:
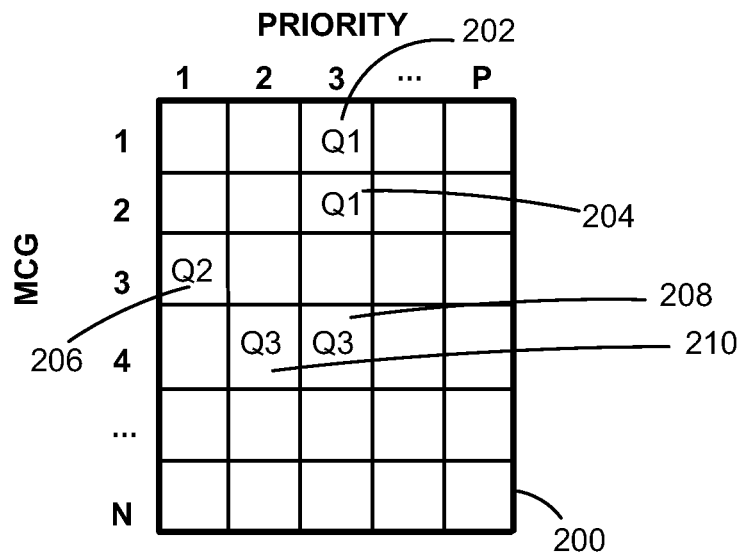
FIG. 3A is a diagram of an example mapping of multicast groups to aggregation queues in accordance with an embodiment of the present disclosure.

FIG. 3A illustrates in more detail some examples of the mapping tables that are suitable to be stored in the mapping memory 140 in accordance with an embodiment of the disclosure. A table 200 is used as the mapping data structure 142 of FIG. 2 to specify how various MCG, priority pairs correspond to the group of MC queues. As is common, lower priority numbers in the table 200 correspond to higher levels of importance, i.e., a flow with priority=1 has a higher priority than a flow with priority=2. To consider one example, an entry 202 specifies that an MC flow with MCG=1 and priority=3 corresponds to MC queue Q1, and an entry 204 specifies that an MC flow with MCG=2 and priority=3 corresponds to the same MC queue Q1. To continue with the example classification scheme discussed above, the MC queue Q1 is a Type I or a Type II MC queue. Referring back to FIG. 1, the entries 202 and 204 correspond to respective MC queue mappings of the MC flows 30 and 32, for example.

As another example, an entry 206 maps an MC flow with MCG=3 and priority=1 to an MC queue Q2. Because no other entry in the table 200 maps an MCG, priority pair to the MC queue Q2, the MC queue is a Type III MC queue used exclusively for the traffic that matches the entry 206.

As yet another example, entries 208 and 210 map two MC flows that have the same MCG but different priorities levels (2 and 3, respectively) to the same MC queue Q3. Thus, depending on whether aggregation is enabled for the MC queue Q3, this queue is a Type I MC queue or a Type II MC queue.

Figure 3B:
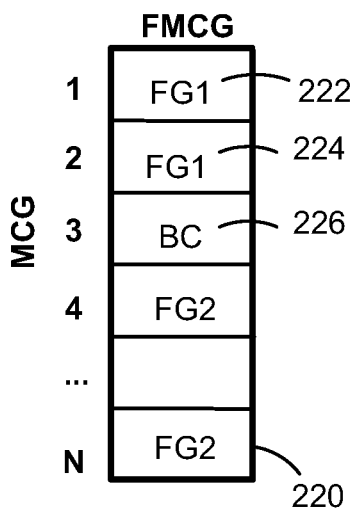
FIG. 3B is a diagram of an example mapping of multicast groups to frame multicast groups in accordance with an embodiment of the present disclosure.

Referring to FIG. 3B, a table 220 specifies, mapping of MCG groups to FMCGs. It will be noted that entries 222 and 224 map MCG groups G1 and G2 to a common FMCG group FG1. In one example, the FMCG group FG1 is a superset of MCGs 1 and 2, i.e., the group FG1 includes every target in G1 and every target in G2. Further, an entry 226 maps MCG group G3 to the broadcast group for the corresponding network, i.e., data directed to group G3 is broadcast to the entire network. Of course, the example mapping in entries 222 and 224 generates a certain amount of overhead, and the mapping in the entry 226 typically generates an even greater overhead. Thus, the table 220 preferably is configured in view of the relevant trade-off factors such as the number of available MC queues, the relative size of MCGs mapped to a common FMCG or a broadcast group, etc.

Figure 3C:
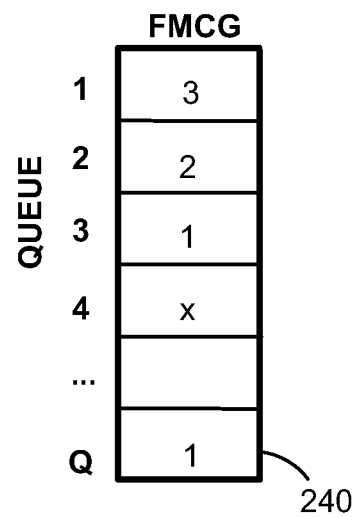
FIG. 3C is a diagram of an example mapping of queues to frame multicast groups in accordance with an embodiment of the present disclosure.

Now referring to FIG. 3C, a table 240 specifies a mapping between MC queues and FMCGs. Unlike the table 220, the table 240 maps entire MC queues to corresponding FMCGs. Thus, a frame into which several data packets have been aggregated is transmitted as a single communication unit to the appropriate FMCG. By contrast, when the table 220 is used, data packets aggregated into a frame may need to be transmitted to different FMCGs, and although frames can be used to aggregate data packets for the purposes of scheduling and routing inside the network switch, such frames cannot always be transmitted as a single communication unit to a common FMCG.

As indicated above, the MC forwarding engine 20 or 110 generally is suitable to operate in a network switch of any size. In some embodiments, the MC forwarding engine 20 operates in a network switch that includes a single packet processor implemented as an application-specific integrated circuit (ASIC). In other embodiments, one or several instances of the MC forwarding engine 20 or 110 operate in a modular network switch that includes multiple packet processors servicing corresponding groups of network ports.

Figure 4:
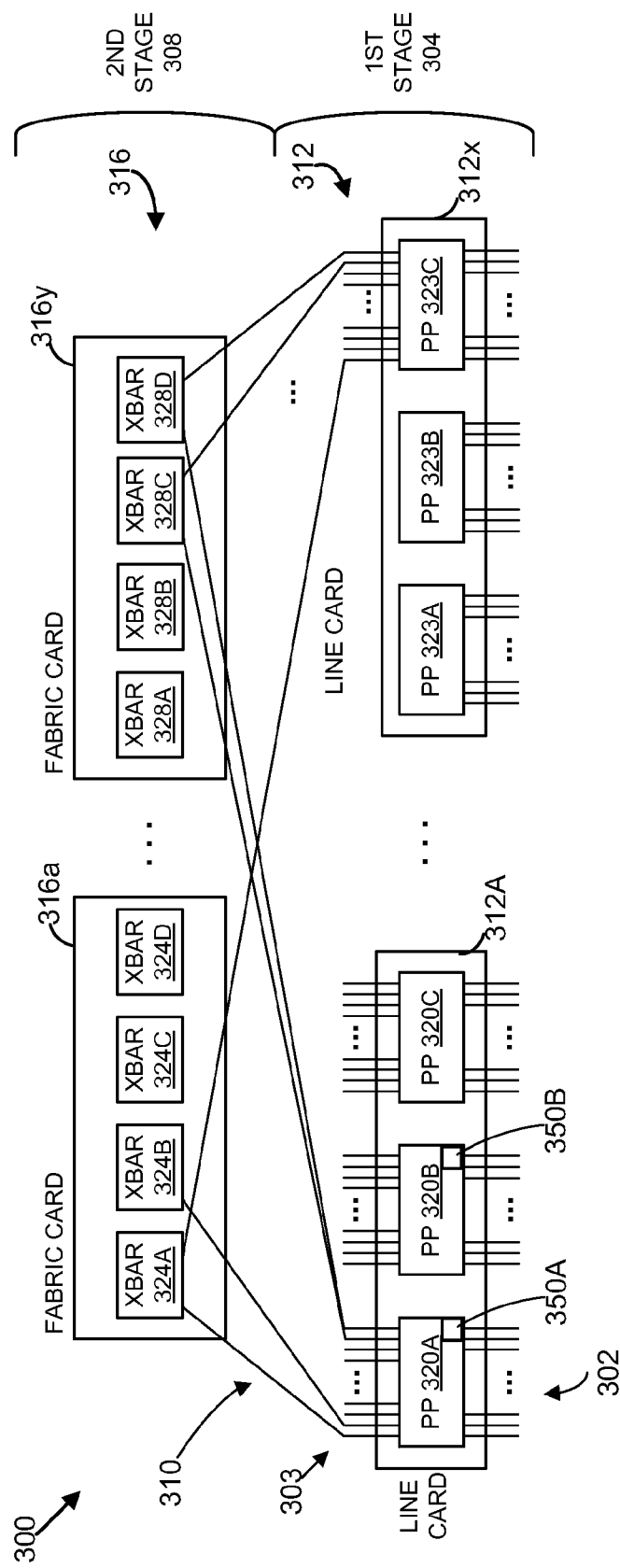
FIG. 4 is a block diagram of an example modular network switch that includes several line cards and several fabric cards in which some of the modules illustrated in FIGS. 1 and 2 can be used in accordance with an embodiment of the present disclosure.

By way of a more specific example, FIG. 4 illustrates a modular network switch 300 that can implement the MC forwarding engine 20 or 100 and operate as the switch 10 of FIG. 1, for example. Of course, other switch architectures, including non-modular architectures, are also suitable. The modular switch 300 comprises a plurality of switching stages including a first stage 304 and a second stage 308. The first stage includes a first plurality of ports 302, referred to herein as front ports or network ports. The network ports 302 are utilized for coupling to LANs, WANs, servers, other switching systems, etc. The first stage also includes a second plurality of ports 303, referred to herein as uplink ports. The uplink ports are utilized for coupling the first stage 304 to the second stage 308 via communication links 310 referred to herein as uplinks. The second stage 308 also includes a plurality of ports (not seen in FIG. 4) that are coupled to the uplinks 310.

Each stage of the modular network switch 300 comprises a plurality of devices arranged in groups. In one embodiment, the first stage 304 comprises X groups of packet processors (PPs), and the second stage 308 comprises Y groups of crossbar devices that provide interconnectivity between PPs in the first stage 304. If desired, PPs can be used as crossbar devices in the second stage 308. In one embodiment, each group of PPs is arranged on a corresponding card that is mounted in a chassis. In this embodiment, the first stage 304 comprises X cards 312 (referred to herein as "line cards"), and the second stage 308 comprises Y cards 316 (referred to herein as "fabric cards"). In the embodiment illustrated in FIG. 4, the modular switch 300 comprises a chassis switching system with the total of M PPs and N crossbar devices mounted in a chassis.

For ease of explanation, the groups of PPs in the first stage 304 is referred to as line cards and the groups of crossbar devices in the second stage 308 is referred to as fabric cards in the description below. Each group of devices, however, need not be arranged on a separate card. Rather, multiple groups of devices can be arranged on a single card. Additionally, the modular switch 300 need not be a chassis switching system and the groups of the PPs or crossbar devices need not be arranged on cards in a chassis.

Generally speaking, when a data unit is received via one of the network ports 302, the data unit is forwarded to one of the fabric cards 316. The fabric card 316 then forwards the data unit to one of the line cards 312, and the data unit is finally transmitted via one of the front ports. In some cases, the PP that receives the data packet transmits portions of the data packet as separate datagrams via several uplinks toward a crossbar device, and the crossbar device similarly transmits the received datagrams toward the PP that includes the egress port. These datagrams, that may be similar to Ethernet packets, are referred to herein as "cells."

To properly route cells, a source PP in the first stage 304 generates forwarding tags for each cell which the crossbar devices use to route the cells to the target PP. Further, because it is more efficient to route larger chunks of data through the stages 304 and 308, PPs such as the PP 120a aggregate data packets received via the network ports 302 in VoQs created and managed for each flow identified by a target and a priority. The PPs then generate frames that include one or several data packets stored in the corresponding VoQ, and typically generate cells using the frame rather than the original data packets. As used herein, communication frames (or just "frames") are communication units that include data that shares a certain target and a certain type of traffic (e.g., a class of service, a traffic class).

In the example system 300, each line card 312 comprises three PPs. For example, the line card 312a includes a PP 320a, a PP 320b, and a PP 320c, and the line card 312b includes a PP 323a, a PP 323b, and a PP 323c. In other embodiments, the line cards 312 may have more or less than three PPs, and each line card 312 need not have the same number of PPs. In the example system 300, each fabric card comprises four crossbar devices. For example, the fabric card 116a includes a crossbar device 324a, a crossbar device 324b, a crossbar device 324c, and a crossbar device 324d. Also, the fabric card 316y includes a crossbar device 328a, a crossbar device 328b, a crossbar device 328c, and a crossbar device 328d.

As discussed above, the system 300 comprises a plurality of PPs and crossbar devices arranged in stages and groups as discussed above. Each PP is a switching device and itself has a plurality of ports. Generally speaking, each PP is capable of receiving a data unit, such as a packet or frame, and making a decision regarding the port of the PP via which the data unit should be transmitted. Then, the PP transmits the data unit via the determined port of the PP.

In an embodiment, each PP in the first stage 304 is coupled to a plurality of fabric cards 116 via at least some of the uplinks 310. For example, each PP in the first stage 304 is coupled to at least one PP in each of the fabric cards 316. In another example, each PP in the first stage 104 is coupled to every PP in the second stage 308. In yet another example, each PP in the first stage 1304 is coupled to a different subset of crossbar devices in the second stage 308. In FIG. 4, only some of the uplinks 310 between the line cards 312a and 312x and the fabric cards 316a and 316y are illustrated, whereas other uplinks, such as uplinks between other PPs and the fabric cards 316, are not illustrated to avoid obscuring the figure.

With continued reference to FIG. 4, each PP in the first stage 304 includes a corresponding MC forwarding engine 350A, 350B, etc. to process MC flows arriving and leaving via the network ports 302, as well as data packets arriving and leaving via uplink ports from other PPs via the crossbar devices in the second stage 308. The MC forwarding engines 350A and 350B may be similar to the MC forwarding engine 20 or 110 described above. In other embodiments, the MC forwarding engines 350A and 350B share some of the data structures such as, for example, the mapping memory 140 (see FIG. 2).

Figure 5:
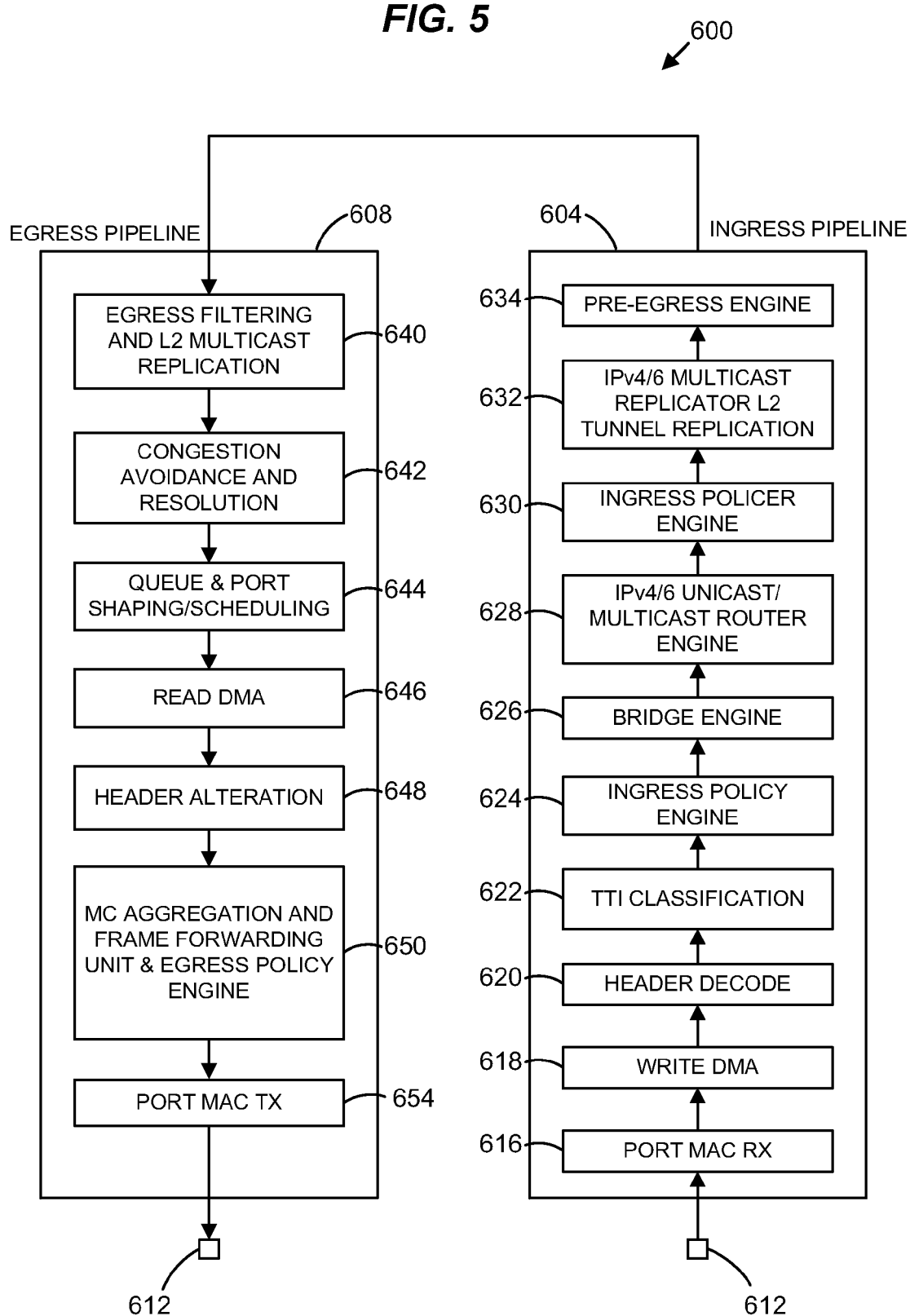
FIG. 5 is a block diagram of an example ingress/egress pipeline of a packet processor that includes some of the modules illustrated in FIGS. 1 and 2 in accordance with an embodiment of the present disclosure.

The MC forwarding engine 20 or 110 is used in a pipeline ingress and egress pipeline 600 illustrated in FIG. 5 to identify MC queues to which data packets should be directed, control aggregation decisions in these queues, maintain MC queue mapping, and support other functions discussed above.

For clarity, FIG. 5 next illustrates a block diagram of an example ingress and egress pipeline 600 of a PP (such as the PP 120a, for example) that includes some of the components discussed above. In particular, the MC forwarding engine 20 or 110 operates in the pipeline 600 to identify MC queues to which data packets should be directed, control aggregation decisions in these queues, maintain MC queue mapping, and support other functions related to MC queuing and aggregation.

Figure 6:
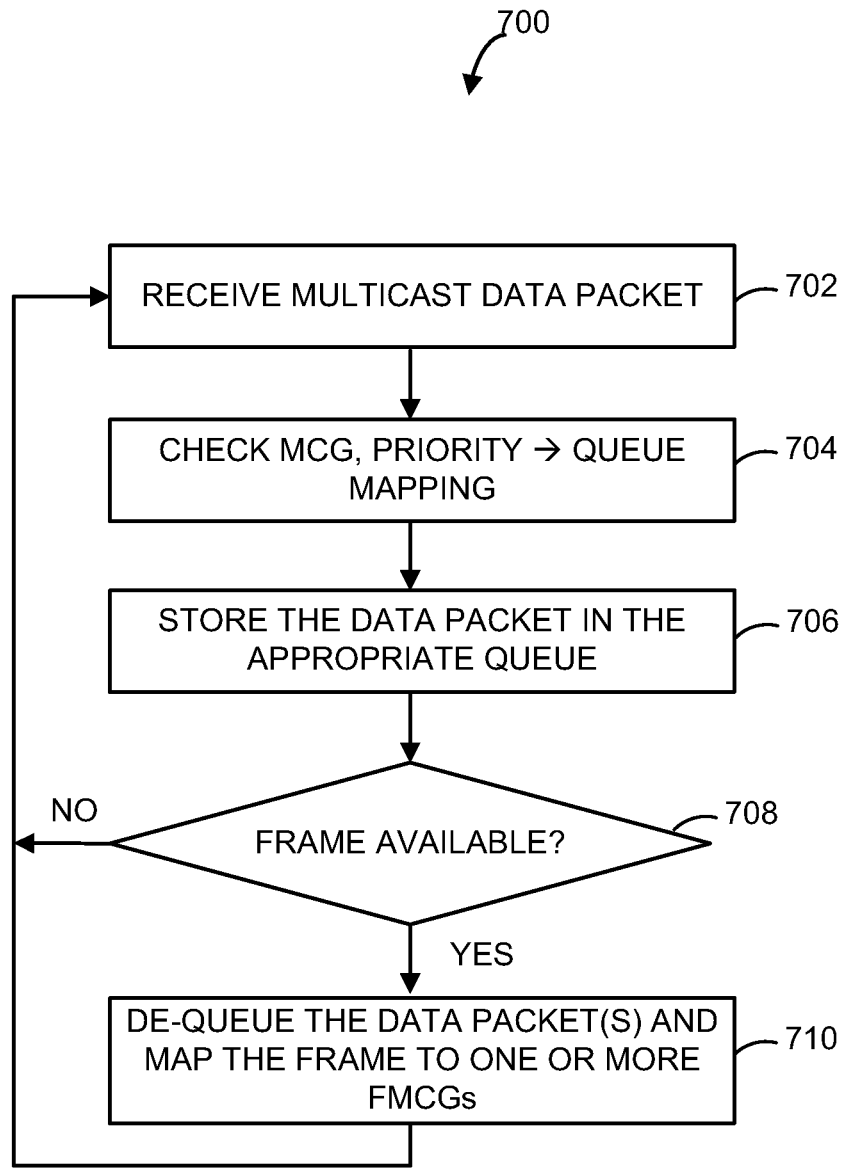
FIG. 6 is a flow diagram of an example method for processing a data packet associated with a multicast traffic flow in accordance with an embodiment of the present disclosure.

The pipeline 600 includes an ingress pipeline 604 and an egress pipeline 608, each coupled to one or more ports 612. Additionally, the ingress pipeline 604 and the egress pipeline 608 are coupled together. The one or more ports 612 can be coupled to one or more networks such as a WAN, a LAN, such as a wired LAN or a wireless LAN, etc. As illustrated in FIG. 6, the ingress pipeline 604 and the egress pipeline 608 each include a plurality of units coupled in series. Generally, each unit of a pipeline optionally processes a frame, a portion of the frame (e.g., a header), or frame descriptor and then passes the frame, portion, or descriptor to the next unit in the pipeline. A descriptor may include some information from the frame, such as some or all of the header information of the data packet. The descriptor may include other information as well such as an indicator of where the data frame is stored in a memory.

The ingress pipeline 604 includes a port media access control (MAC) receiver unit 616 coupled to the one or more ports 612, a write DMA unit 618, a header decode unit 620, a tunnel termination and interface (TTI) classification unit 622 is coupled to the header decode unit 620, an ingress policy engine 624, a bridge engine 626, a router engine 628 an ingress policer engine 630 may be coupled to the router engine 628. In an embodiment, the ingress policer engine 630, a multicast replicator 632, and a pre-egress engine 634.

The pre-egress engine 634 is coupled to the egress pipeline 608 so that the pre-egress engine 634 can send frame descriptors to the egress pipeline 608. In particular, the ingress pipeline 604 is coupled to an egress filtering and Layer-2 multicast replication unit 640. The egress pipeline 608 further includes a congestion avoidance and resolution unit 642, a queue and port shaping/scheduling unit 644, a read DMA unit 646, and a header alteration unit 648.

With continued reference to FIG. 5, an MC aggregation and frame forwarding and the egress policy unit 650 includes at least some of the component of the network switch 10 discussed above. For example, the unit 650 includes the MC forwarding engine 20 or 110. The unit 650 also determines a flow to which an egressing data frame belongs and attaches a flow identifier to the egressing data frame. Specifically regarding MC flows, the unit 650 maps multiple MC flows to a common MC queue using the techniques discussed with reference to FIGS. 1-3C. Further, the unit 650 associates some frames with individual data packets for some of the MC queues, and associates other frames with multiple data packets for other MC queues.

A port MAC transmit unit 654 is coupled to the egress policy engine 652. The port MAC transmit unit 654 generally implements media access control functions and forwards packets to appropriate ports 612. The port MAC transmit unit 652 also forwards or mirrors packets to the CPU (not shown).

From the foregoing, it is noted that the network switch 10 efficiently utilizes memory and processing resources and supports flexibility in MC queue management and usage. Next, several example methods for implementing the techniques described herein are discussed with reference to flow diagrams of FIGS. 6-9.

FIG. 6 is a flow diagram of an example method 700 for processing an MC data packet. The MC forwarding engine 110 (see FIG. 2) can implement the at least a portion of the method 700. At block 702, an MC data packet is received. In general, an MC data packet is associated with a data flow directed to a certain group of targets, i.e., an MCG, and having a certain priority. The MCG and priority of the received data packet are applied to an appropriate mapping data structure to identify an MC queue in which the data packet should be stored (block 704). For example, in an embodiment, a table similar to the table 200 illustrated in FIG. 3C is used. At block 706, the data packet is stored in the MC queue identified at block 704.

Next, an aggregator such as one of the aggregators 126 or 128 checks whether a complete frame can be assembled using the one or several data packets stored in the MC queue (block 706). These operations are discussed in more detail with reference to FIG. 7. If a complete frame cannot be assembled, the method 700 returns to block 702 to receive another MC data packet.

Otherwise, at block 708, the completed frame is forwarded to one or more FMCGs. In particular, an appropriate configuration parameter (e.g., the enable multicast group mapping parameter 136 illustrated in FIG. 2) is checked to determine whether all traffic from the MC queue is directed to a common FMCG. This procedure is discussed in more detail below with reference to FIG. 8. Upon forwarding a completed frame to a plurality targets corresponding to one or more FMCGs, the one or more data packets transmitted as the frame is dequeued, and the method 700 returns to block 702 to process the next data packet.

Figure 7:
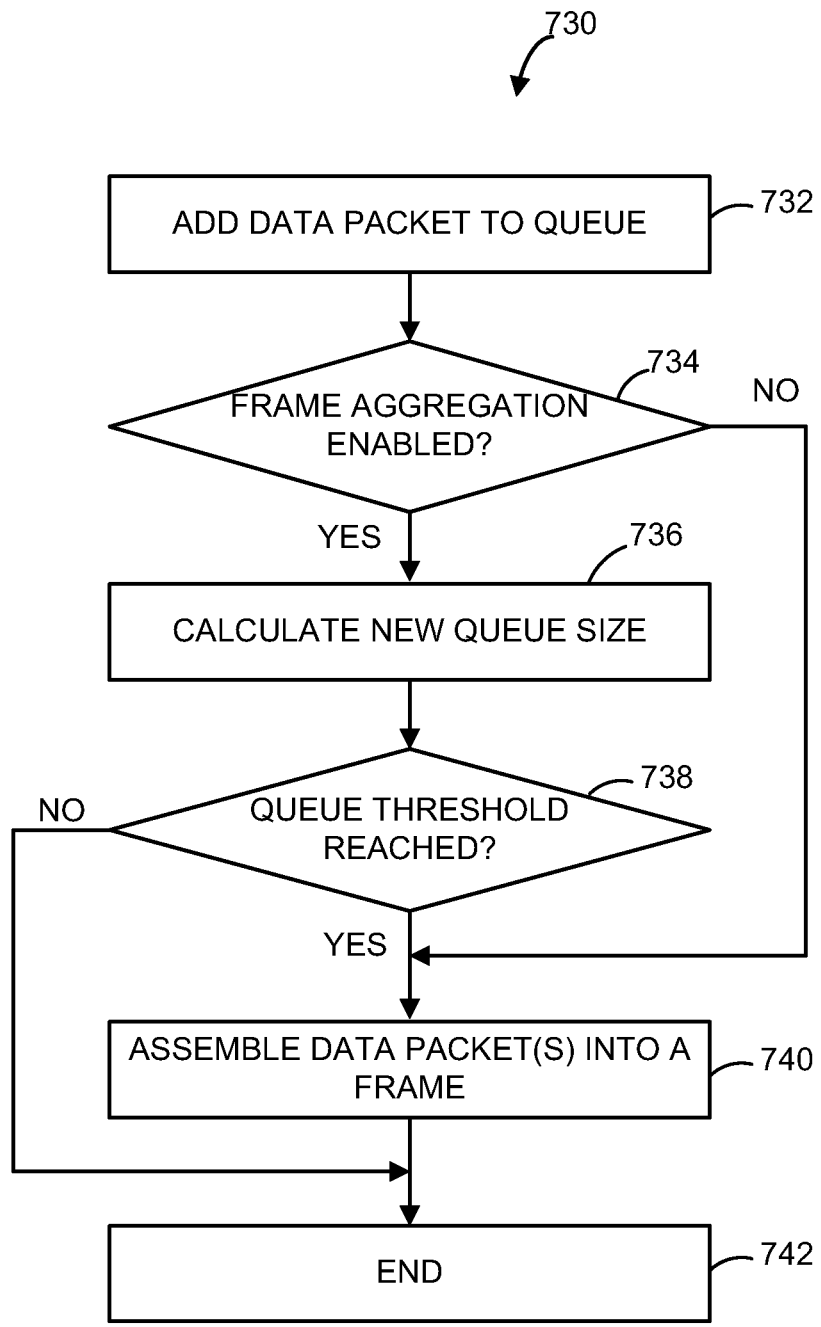
FIG. 7 is a flow diagram of an example method for aggregating data packets in an aggregation queue in accordance with an embodiment of the present disclosure.

FIG. 7 is a flow diagram of an example method 730 for aggregating data packets in an aggregation queue. Some or all of the steps of the method 732 are executed at blocks 706 and/or 708 discussed with reference to FIG. 6 by the aggregator 126 or 128, for example, or the packet manager 152 (see FIG. 2). At block 732, a data packet is received for a particular MC queue (e.g., one of the MC queues 122). Next, the method 730 checks whether frame aggregation is enabled for the MC queue (block 734) using a parameter (such as the parameter 134 discussed above) and, if frame aggregation is enabled, the new size of the MC queue is calculated at block 736. Otherwise, the method 730 proceeds directly to block 740.

At block 738, the size of the MC queue is compared to a threshold value to determine whether the corresponding frame threshold has been reached. If desired, each MC queue is configured with a separate threshold. Moreover, it is possible to dynamically control threshold values.

If it is determined that the size of the queue is equal to or larger than the frame threshold, the one or more data packets stored in the MC queue are assembled into a frame (block 740). In particular, a frame header is generated and the one or more data packets are added to locations within the frame consistent with the desired frame format. If, on the other hand, it is determined that the size of the queue is smaller than the threshold value, the method 730 transitions to the end block 742.

Figure 8:
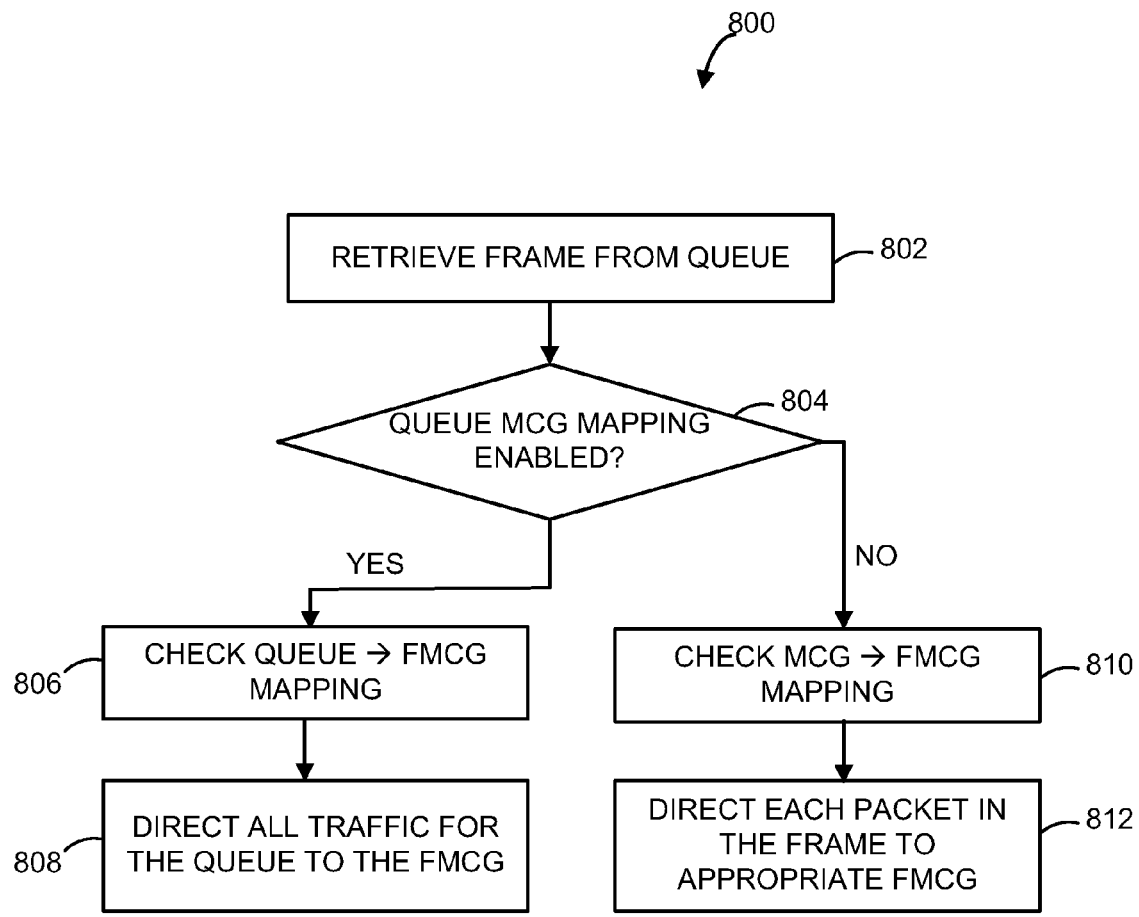
FIG. 8 is a flow diagram of an example method for processing data stored in an aggregation queue in accordance with an embodiment of the present disclosure.

Referring to FIG. 8, a method 800 for processing data stored in an aggregation queue can be implemented by one or several components of the MC forwarding engine 20 or 110 (e.g., the packet manager 152). At block 802, a completed frame is retrieved from an MC queue. From the foregoing, it is noted that a frame can include one or several data packets, and can be routed to a certain FMCG defined as one of the MCGs, a superset of two or more MCGs, or a broadcast. At block 804, the appropriate configuration parameter of an MC queue (e.g., the parameter 736 discussed with reference to FIG. 2) is checked to determine whether queue MCG mapping is enabled and, accordingly, which mapping data structure should be used to determine the appropriate group of targets for the frame.

If queue MCG mapping is enabled, queue-to-MCG mapping is applied at block 806. To this end, a data structure such as the table 240 illustrated in FIG. 3C is used in accordance with an embodiment of the disclosure. Next, at block 808, the frame is directed to every target associated with the FMCG. Thus, if the frame includes a first data packet directed to MCG G1 and a second data packet directed to MCG G2, the frame is forwarded to an FMCG that includes every target in the MCG G1 and the MCG G2.

If queue MCG mapping is disabled, MCG-to-FMCG mapping is applied at block 810. A data structure such as the table 220 illustrated in FIG. 3B can be used to determine the appropriate FMCG for each data packet in the frame.

Figure 9:
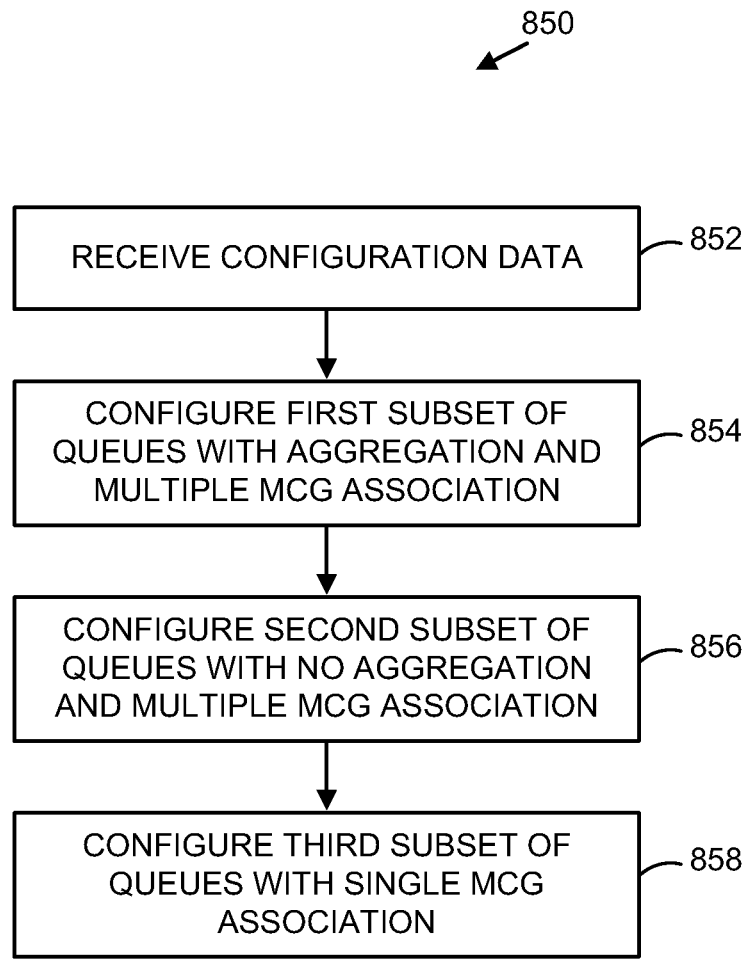
FIG. 9 is a flow diagram of an example method for configuring a set of aggregation queues for use with multicast traffic in accordance with an embodiment of the present disclosure.

Next, FIG. 9 illustrated an example method 850 for configuring a set of MC queues for use with multicast traffic. As one example, the method 850 operates on the set of MC queues 122, 123, and 124 discussed with reference to FIG. 2. At block 852, the MC configuration manager 154 or a similar module receives MC queue configuration. In general, it is possible to apply MC queue configuration at start-up of the network switch 10 or during runtime, i.e., dynamically. The configuration data specifies one or more of Type I MC queues, one or more of Type II MC queues, and one or more of Type III MC queues. Accordingly, the method 850 need not always execute each of the blocks 854-858.

At block 854, one or more MC queues are configured to store data packets associated with two more MC flows. As discussed above, the multiple MC flows differ in at least one of MCG and priority. Referring back to FIG. 3A, a structure such as the mapping table 200 can be used to specify the relationship between several MC flows and each of the MC queues configured at block 854. Further, frame aggregation is enabled for these MC queues using the enable frame aggregation parameter 134, for example.

At block 856, one or more MC queues are configured as described above, except that frame aggregation can be disabled for these MC queues using the enable frame aggregation parameter 134 or a similar flag. Similar to MC queues discussed with reference to block 854, multiple MC flows that differ in at least one of MCG and priority can be mapped to a single MC queue at block 856.

Finally, at block 858, one or more MC queues are configured for single association with a particular MCG and a particular priority. However, it will be noted that it is also possible to also configure an MC queue for exclusive use by flows directed to a certain MCG having any available priority. Referring back to FIG. 3A, for example, an entire row of the table 200 is populated with a same MC queue identifier without setting any other entry in the able 200 to this MC queue identifier. As yet another alternative, it is possible to define an exclusive relationship between an MC queue and a certain priority irrespective of MCG association. To continue with the example table 200, this configuration corresponds to an entire column of the table 200 being populated with a same MC queue identifier, and no other entry in the able 200 specifying this MC queue identifier.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored on any computer readable medium such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of configuring a plurality of aggregation queues to aggregate multicast network traffic, the method comprising:

configuring a first one of the plurality of aggregation queues to store at least data units associated with a first multicast group (MCG) and data units associated with a second MCG, including storing first configuration data in a configuration memory, the first configuration data indicating to a switching device that the switching device is to store data units associated with the first MCG and data units associated with the second MCG in the first one of the plurality of aggregation queues, wherein each aggregation queue in the plurality of aggregation queues is independently configurable either (i) to store data units associated with multiple multicast groups, or (ii) to store data units associated with only a single multicast group; and configuring a second one of the plurality of aggregation queues to store only those data units that are associated with a third MCG including storing second configuration data in the configuration memory, the second configuration data indicating to the switching device that the switching device is to store only data units associated with the third MCG in the second one of the plurality of aggregation queues.

2. The method of claim 1, wherein configuring the first one of the plurality of aggregation queues and the second one of the plurality of aggregation queues includes populating a mapping data structure to associate a plurality of data flows with the plurality of aggregation queues; wherein each of the plurality of data flows is associated with a particular MCG and one of a plurality of priorities; and wherein the mapping data structure maps a first data flow associated with the first MCG and a second data flow associated with the second MCG to the first one of the plurality of aggregation queues.

3. The method of claim 2, wherein the first data flow and the second data flow are associated with different ones of the plurality of priorities.

4. The method of claim 2, wherein the first data flow and the second data flow are associated with a same one of the plurality of priorities.

5. The method of claim 1, further comprising configuring a third one of the plurality of aggregation queues to store data units associated with at least a fourth MCG and a fifth MCG; wherein multiple data units stored in the first one of the plurality of aggregation queues are aggregated into a single frame prior to being transmitted; and data units stored in the third one of the plurality of aggregation queues are transmitted separately as respective frames.

6. The method of claim 5, further comprising:

receiving a first configuration parameter for the first one of the plurality of aggregation queues, the first configuration parameter indicating that data unit aggregation is enabled for data units stored in the first one of the plurality of aggregation queues;

receiving a second configuration parameter for the third one of the plurality of aggregation queues, the second configuration parameter indicating that data unit aggregation is disabled for data units stored in the third one of the plurality of aggregation queues.

7. The method of claim of claim 1, further comprising:

populating a first mapping data structure to associate at least some of the plurality of aggregation queues with a first set of frame multicast groups (FMCGs); and populating a second mapping data structure to associate a plurality of MCGs that includes the first MCG, the second MCG, and the third MCG with a second set of FMCGs;

wherein each of the plurality of aggregation queues is associated with either the first mapping data structure or the second mapping data structure.

8. The method of claim 7, further comprising:

receiving a configuration parameter for each of the plurality of aggregation queues, wherein the configuration parameter specifies whether the corresponding queue is associated with the first mapping data structure or the second mapping data structure.

9. The method of claim 7, wherein at least one of the plurality of FMCGs is a superset of two or more MCGs mapped to the FMCG.

10. The method of claim 1, wherein at least one of the plurality of FMCGs is a broadcast group.

11. An apparatus comprising:

a memory interface communicatively coupled to a queue memory configured to store a plurality of aggregation queues, each aggregation queue being independently configurable either (i) to store data units associated with multiple multicast flows, or (ii) to store data units associated with only a single multicast flow;

a configuration memory that stores configuration information mapping multicast flows to aggregation queues in the queue memory; and a multicast forwarding engine configured to determine, using the configuration information in the configuration memory, that a first data unit associated with a first multicast flow is to be stored in a first one of the plurality of aggregation queues, and cause the first data unit to be stored in the first one of the plurality of aggregation queues, determine, using the configuration information in the configuration memory, that a second data unit associated with a second multicast flow is to be stored in the first one of the plurality of aggregation queues, wherein the second multicast flow differs from the first multicast flow in at least one of priority and multicast group (MCG), and cause the second data unit to be stored in the first one of the plurality of aggregation queues, and determine, using the configuration information in the configuration memory, that a third data unit associated with a third multicast flow is to be stored in a second one of the plurality of aggregation queues, and cause the third data unit to be stored in the second one of the plurality of aggregation queues.

12. The apparatus of claim 11, wherein the configuration memory further stores, for each of the plurality of aggregation queues a configuration parameter that specifies whether aggregation of multiple data packets stored in the corresponding queue into a single frame is enabled;

wherein the multicast forwarding engine is further configured to enable or disable aggregation in accordance with the configuration parameter.

13. The apparatus of claim 11, wherein the configuration memory further stores, for each of the plurality of aggregation queues a configuration parameter that specifies whether the corresponding queue corresponds to a certain frame multicast group (FMCG);

wherein the multicast forwarding engine is further configured to:
when the configuration parameter is set to a first value, forward all data stored in the corresponding queue to the certain FMCG, and
when the configuration parameter is set to a second value, forward each data unit stored in the corresponding queue to an FMCG selected based on an MCG with which the data unit is associated.

14. The apparatus of claim 11, wherein the first one of the plurality of aggregation queues is a first queue; and wherein the plurality of aggregation queues further includes:
a second queue to store data units associated with at least a first MCG/priority pair and a second MCG/priority pair distinct from the first MCG/priority pair;
wherein the second one of the plurality of aggregation queues is a third queue to store only those data units that are associated with a third MCG/priority pair;
wherein the multicast forwarding engine is configured to:
aggregate multiple data units stored in the first queue into a single communication frame;
associate each data unit stored in the second queue with a separate communication frame; and
aggregate multiple data units stored in the third queue into a single communication frame.

15. The apparatus of claim 11, wherein the configuration memory further stores:
a mapping data structure to map a plurality of MCG/priority pairs to the plurality of aggregation queues.

16. The apparatus of claim 11, wherein the configuration memory further stores:
a first mapping data structure that maps at least some of the plurality of aggregation queues to respective FMCGs; and
a second mapping data structure that maps a plurality of MCGs to respective FMCGs;
wherein each of the plurality of aggregation queues is associated with either the first mapping data structure or the second mapping data structure.

17. The method of claim 1, further comprising:
receiving a first data unit associated with a first multicast flow and the first MCG;
receiving a second data unit associated with a second multicast flow and the second MCG;
selecting the first one of the plurality of aggregation queues for storing the first data unit and the second data unit;
causing the first data unit and the second data unit to be stored in the first one of the plurality of aggregation queues;
receiving a third data unit associated with a third multicast flow and the third MCG; and
causing the third data unit to be stored in the second one of the plurality of aggregation queues.

18. The method of claim 17, wherein selecting the first one of a plurality of aggregation queues includes utilizing a look-up table indexed by (i) an MCG index and (ii) a priority index, wherein at least two entries of the look-up table specify a same one of the plurality of aggregation queues.

19. The method of claim 17, further comprising:
checking whether frame aggregation is enabled for the first one of the plurality of aggregation queues;
if frame aggregation is disabled, forwarding each of the first data unit and the second data unit in a separate communication frame; and
if frame aggregation is enabled:
comparing the size of a data stored in the first one of the plurality of aggregation queues to a threshold value, and
forwarding the data in a single communication frame if the size of the data is equal to or greater than the threshold value.

* * * * *